US012686508B2

(12) United States Patent
Peterson

(10) Patent No.: US 12,686,508 B2
(45) Date of Patent: Jul. 21, 2026

(54) SPACE-BASED DISTRIBUTED RADAR SYSTEM FOR FACILITATING IMAGING OF AREAS

(71) Applicant: Array Labs Inc., Palo Alto, CA (US)

(72) Inventor: Andrew Peterson, Sunnyvale, CA (US)

(73) Assignee: ARRAY LABS INC., Redwood City, CA (US)

( * ) Notice: Subject to any disclaimer, the term of this patent is extended or adjusted under 35 U.S.C. 154(b) by 293 days.

(21) Appl. No.: 18/691,033

(22) PCT Filed: Sep. 21, 2022

(86) PCT No.: PCT/US2022/044263
§ 371 (c)(1),
(2) Date: Mar. 11, 2024

(87) PCT Pub. No.: WO2023/049186
PCT Pub. Date: Mar. 30, 2023

(65) Prior Publication Data
US 2024/0369698 A1      Nov. 7, 2024

Related U.S. Application Data

(60) Provisional application No. 63/246,659, filed on Sep. 21, 2021.

(51) Int. Cl.
*B64G 1/10*          (2006.01)
*G01S 13/90*          (2006.01)

(52) U.S. Cl.
CPC ......... *B64G 1/1085* (2013.01); *B64G 1/1035* (2023.08); *G01S 13/9058* (2019.05)

(58) Field of Classification Search
CPC ........................... B64G 1/1035; B64G 1/1085
See application file for complete search history.

(56) References Cited

U.S. PATENT DOCUMENTS 10,144,533 B2 * 12/2018 Atwater ............... B64G 1/1085
10,368,251 B1 * 7/2019 Olds ........................ B64G 1/66
(Continued)

OTHER PUBLICATIONS

Hodges, R., Shah, B., Muthulingham, D. and Freeman, T. 2013. "ISARA—Integrated Solar Array and Reflectarray Mission Overview" Presentation Slides, Proceedings of the Small Satellite Conference, Pre-Conference: CubeSat Developers' Workshop. http://digitalcommons.usu.edu/smallsat/2013/all2013/12/ (Year: 2013).*
(Continued)

*Primary Examiner* — Richard Green
(74) *Attorney, Agent, or Firm* — Madhumita Datta; Buchalter

(57) ABSTRACT

Disclosed herein is a space-based distributed radar system for facilitating imaging of areas, in accordance with some embodiments. Further, the space-based distributed radar system comprises a satellite cluster including satellites. Further, the satellites in the satellite cluster flies in a formation that transitions between orientations in relation to an area. Further, each satellite comprises a bay, a panel comprising a solar panel array and a microstrip antenna array, a transmitter, and a receiver. Further, the transmitter simultaneously transmits a signal towards the area using the microstrip antenna array in each of the orientations based on generating a signal information. Further, the receiver of each of the satellites receives a return signal from the area using the microstrip antenna array in each of the orientations for producing a return signal information. Further, an image of the area is formed using the signal information and the return signal information.

20 Claims, 23 Drawing Sheets

(56)  References Cited

U.S. PATENT DOCUMENTS

| | | | | |
|---|---|---|---|---|
| 10,718,869 | B2 * | 7/2020 | Yunck .................. | B64G 1/1035 |
| 10,962,639 | B2 * | 3/2021 | Weissman ............ | B64G 1/1021 |
| 2014/0009324 | A1 | 1/2014 | Ranney et al. | |
| 2020/0233080 | A1 * | 7/2020 | Weissman ............ | B64G 1/1021 |
| 2020/0252154 | A1 | 8/2020 | Wu et al. | |

OTHER PUBLICATIONS

Authors: Hartmut Runge, Richard Bamler, Josef Mittermayer, Fritz Jochim, Didier Massonnet, Eric Thouvenot Title: The Interferometric Cartwheel for Envisat Publication Date: 2001 Publisher: 3rd IAA Symposium on Small Satellites for Earth Observation.

Authors: Ray Zenick, Kimberely Kohlhepp Title: GPS Micro Navigation and Communication System for Clusters or Micro and Nanosatellites Published Date: 2000 Publisher: 14th Annual AIAA/USU Conference on Small Satellites.

Authors: Tommy Teer, Nathan A. Goodman Title: Multistatic SAR Algorithm with Image Combination Published Date: 2006 Publisher: IEEE.

Authors: Gerhard Krieger, Irena Hajnsek, Konstantinos Panagiotis Papathanassiou, Marwan Younis, Alberto Moreira Title: Interferometric Synthetic Aperture Radar (SAR) Missions Employing Formation Flying Published Date: 2010 Publisher: IEEE.

Authors: Helena Cruz, Mário Véstias, José Monteiro, Horácio Neto, Rui Policarpo Duarte Title: A Review of Synthetic-Aperture Radar Image Formation Algorithms and Implementations: A Computational Perspective Published Date: 2022.

Authors: Gerhard Krieger, Alberto Moreira Title: Multistatic SAR Satellite Formations: Potentials and Challenges Publication Date: 2005 Publisher: IEEE.

Author: John L. Mohammed Title: Mission Planning for a Formation-Flying Satellite Cluster Publication Date: 2001.

Authors: Chad Knight, Ross Deming, Jake Gunther Title: Multi-Static MIMO Along-Track Interferometry (ATL) Published Date: 2016 Publisher: Space Dynamics Laboratory Publications.

Authors: Mario Azcueta, Stefano Tebaldini Title: Non-cooperative Bistatic SAR Clock Drift Compensation for Tomographic Acquisitions Published Date: 2017 Publisher: Remote Sens.

International Search Report and Written Opinion in International App. No. PCT/US22/44263 dated Feb. 22, 2023, 8 pages.

* cited by examiner

- AN IMAGE
- A SIGNAL INFORMATION
- A RETURN SIGNAL INFORMATION

2200

| Possible Satellite Technical Data – 50 Satellite Cluster | | | |
|---|---|---|---|
| Orbit | 500 km | Panel Area | 230 sq cm |
| Orbit Type | SS Terminator | Tx and DL Freq. | 8-10 GHz |
| Mass | 3 kg | Avg Tx Power | 70 W |
| Volume | 5 U | Battery Size | 50 W-hr |
| Image Resolution | 20 cm | Onboard Storage | 1 TB |
| Daily Collection (Cluster) | 1.8 M sq km | Max. Collect. Rate (Cluster) | 875 sq km per sec |

FIG. 22

SPACE-BASED DISTRIBUTED RADAR SYSTEM FOR FACILITATING IMAGING OF AREAS

This application is a national-phase application, under 35 U.S.C. 371, of international application serial number PCT/US2022/044263 titled, "A Space-Based Distributed Radar System for Facilitating Imaging of Areas." filed Sep. 21, 2022, which application claims priority to the U.S. provisional patent application Ser. No. 63/246,659 titled, "Space-Based Distributed Radar System Capable of Tomographic Imaging." filed on Sep. 21, 2021. Each of the foregoing applications is herein incorporated by reference in its entirety.

FIELD OF THE INVENTION

Generally, the present disclosure relates to the field of data processing. More specifically, the present disclosure relates to a space-based distributed radar system for facilitating imaging of areas.

BACKGROUND OF THE INVENTION

Synthetic Aperture Radar (SAR) is a form of radar that can create two-dimensional images or even three-dimensional reconstructions of objects, such as landscapes. It is capable of operating at night and can see through clouds, smoke, and rain.

SAR uses the motion of the radar antenna over a target region to provide finer special resolution than conventional scanning radars. SAR systems are typically mounted on a moving platform, such as an aircraft or spacecraft. The distance the SAR system travels during the period when a scene is illuminated creates a large 'synthetic' aperture. The larger the aperture, the finer the spatial resolution of the resulting image. This allows SAR systems to generate very high-resolution imagery with relatively small antennas.

Most SAR systems use a single antenna which is used to both transmit and receive energy to and from the imaging scene. This is known as a monostatic or monolithic radar system. While this is the most common architecture, it is possible to use multiple antennas or even multiple radars working together (either simultaneously, or asynchronously) to obtain more information about the target scene or to improve one or more other aspects of system performance such as total daily coverage area or coverage speed. Traditional SAR radars use a technique known as Linear Frequency Modulation with dechirp on receive, which lowers the computational and bandwidth requirements needed to generate high-resolution imagery. Unfortunately, this technique requires extremely precise synchronization between the transmitter and receiver, which is very challenging for non-collocated systems.

Existing systems for imaging areas are deficient with regard to several aspects. For instance, current systems are designed with a single antenna having a specific coverage area. As a result, different systems designed with different configurations of antennae are needed to increase the coverage area. Furthermore, current systems are designed with a single antenna having a specific coverage speed. As a result, different systems designed with different configurations of antennae are needed to increase the coverage speed. Moreover, current systems are designed with a single antenna that is used to generate images of a specific quality. As a result, different systems are needed with different configurations of antennae to increase the quality of images generated by the different configurations of antennae.

Therefore, there is a need for a space-based distributed radar system for facilitating imaging of areas that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a space-based distributed radar system for facilitating imaging of areas, in accordance with some embodiments. Further, the space-based distributed radar system may include at least one satellite cluster including a plurality of satellites. Further, the plurality of satellites of each of the at least one satellite cluster flies in a formation. Further, the formation of each of the at least one satellite cluster transitions between a plurality of orientations in relation to an area. Further, each of the plurality of satellites may include a bay, a panel, a transmitter, and a receiver. Further, the panel may be coupled to the bay. Further, the panel may include a solar panel array mounted on a first side of the panel and a microstrip antenna array mounted on a second side opposite to the first side of the panel. Further, the solar panel array may be configured for powering each of the plurality of satellites. Further, the transmitter may be disposed in the bay. Further, the transmitter may be coupled to the microstrip antenna array. Further, the transmitter of each of the plurality of satellites may be configured for simultaneously transmitting a signal towards the area using the microstrip antenna array in each of the plurality of orientations of each of the at least one satellite cluster based on generating a signal information of the signal. Further, the receiver may be disposed in the bay. Further, the receiver may be coupled to the microstrip antenna array. Further, the receiver of each of the plurality of satellites may be configured for receiving a return signal from the area using the microstrip antenna array in each of the plurality of orientations of each of the at least one satellite cluster based on the simultaneous transmitting for producing a return signal information associated with the return signal. Further, an image of the area may be formed using the signal information and the return signal information.

Further disclosed herein is a space-based distributed radar system for facilitating imaging of areas, in accordance with some embodiments. Further, the space-based distributed radar system may include at least one satellite cluster including a plurality of satellites. Further, the plurality of satellites of each of the at least one satellite cluster flies in a formation. Further, the formation of each of the at least one satellite cluster transitions between a plurality of orientations in relation to an area. Further, each of the plurality of satellites may include a bay, a panel, a transmitter, and a receiver. Further, the panel may be coupled to the bay. Further, the panel may include a solar panel array mounted on a first side of the panel and a microstrip antenna array mounted on a second side opposite to the first side of the panel. Further, the solar panel array may be configured for powering each of the plurality of satellites. Further, the transmitter may be disposed in the bay. Further, the transmitter may be coupled to the microstrip antenna array. Further, the transmitter of each of the plurality of satellites may be configured for simultaneously transmitting a signal towards the area using the microstrip antenna array in each of the plurality of orientations of each of the at least one satellite cluster based on generating a signal information of the signal. Further, the receiver may be disposed in the bay. Further, the receiver may be coupled to the microstrip antenna array. Further, the receiver of each of the plurality of satellites may be configured for receiving a return signal from the area using the microstrip antenna array in each of the plurality of orientations of each of the at least one satellite cluster based on the simultaneous transmitting for producing a return signal information associated with the return signal. Further, an image of the area may be formed using the signal information and the return signal information. Further, one of the plurality of satellites of each of the at least one satellite cluster may include a processing device disposed in the bay of one of the plurality of satellites. Further, the processing device may be communicatively coupled with the transmitter and the receiver of each of the plurality of satellites. Further, the processing device may be configured for generating the image of the area using the signal information and the return signal information.

Further disclosed herein is a space-based distributed radar system for facilitating imaging of areas, in accordance with some embodiments. Further, the space-based distributed radar system may include at least one satellite cluster including a plurality of satellites. Further, the plurality of satellites of each of the at least one satellite cluster flies in a formation. Further, the formation of each of the at least one satellite cluster transitions between a plurality of orientations in relation to an area. Further, each of the plurality of satellites may include a bay, a panel, a transmitter, and a receiver. Further, the panel may be coupled to the bay. Further, the panel may include a solar panel array mounted on a first side of the panel and a microstrip antenna array mounted on a second side opposite to the first side of the panel. Further, the solar panel array may be configured for powering each of the plurality of satellites. Further, the transmitter may be disposed in the bay. Further, the transmitter may be coupled to the microstrip antenna array. Further, the transmitter of each of the plurality of satellites may be configured for simultaneously transmitting a signal towards the area using the microstrip antenna array in each of the plurality of orientations of each of the at least one satellite cluster based on generating a signal information of the signal. Further, the transmitter of each of the plurality of satellites may be configured for implementing one of the plurality of orthogonally coded pseudo-noise waveforms. Further, the simultaneous transmitting of the signal may be based on the implementing of one of the plurality of orthogonally coded pseudo-noise waveforms. Further, the receiver may be disposed in the bay. Further, the receiver may be coupled to the microstrip antenna array. Further, the receiver of each of the plurality of satellites may be configured for receiving a return signal from the area using the microstrip antenna array in each of the plurality of orientations of each of the at least one satellite cluster based on the simultaneous transmitting for producing a return signal information associated with the return signal. Further, an image of the area may be formed using the signal information and the return signal information.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 22 is a table of one or more technical data associated with a plurality of satellites of a space-based distributed radar system for facilitating imaging of areas, in accordance with some embodiments.

DETAIL DESCRIPTIONS OF THE INVENTION

Figure 1:
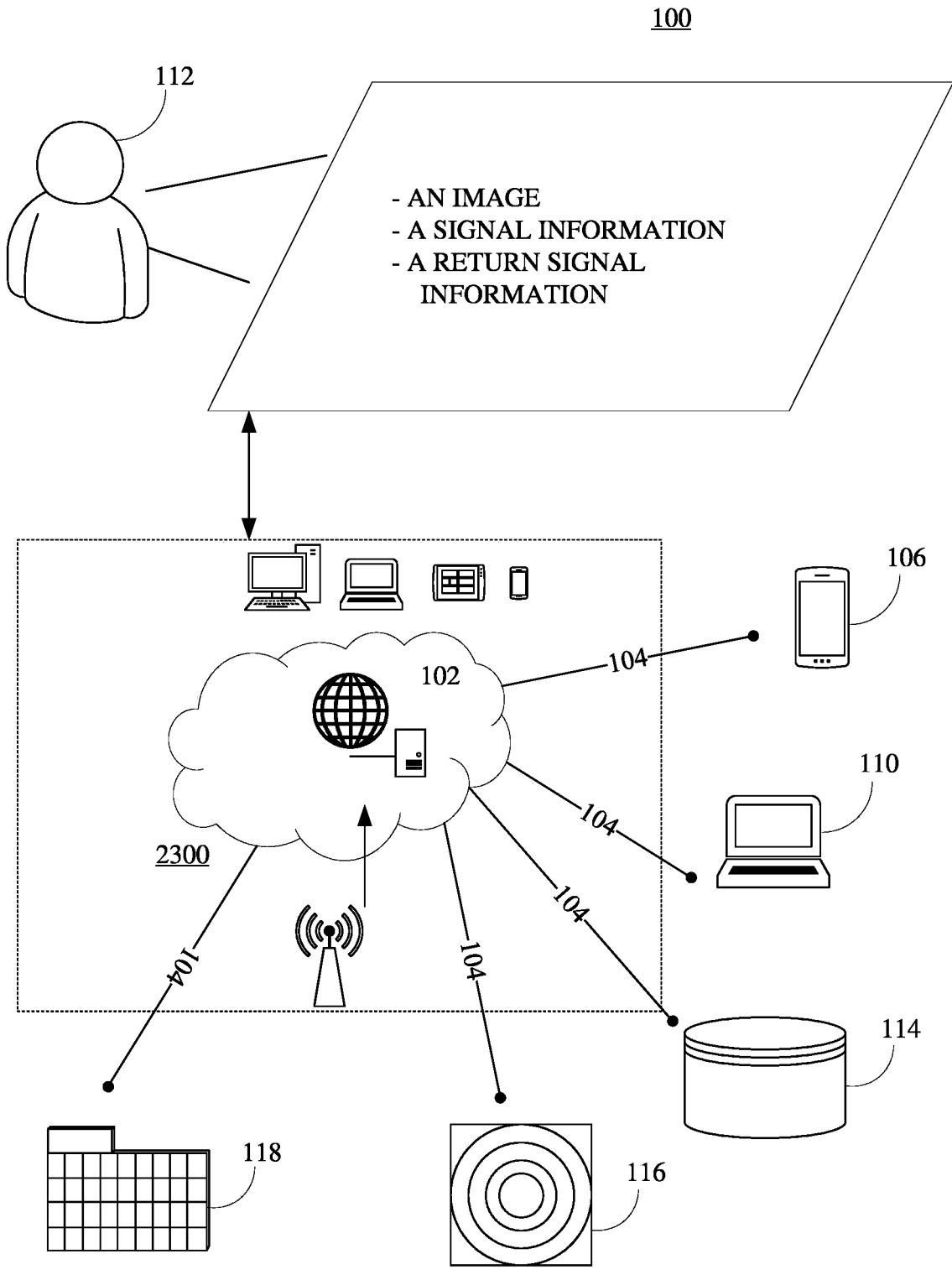
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a space-based distributed radar system for facilitating imaging of areas, embodiments of the present disclosure are not limited to use only in this context.

In general, the system disclosed herein may include one or more satellites. Further, the one or more satellites may include a CubeSat. Further, the one or more satellites may be nanosatellites. Further, the one or more satellites may include a computing device or a computer. Further, the computing device or the computer may include a processing device, a communication device, and a storage device. Further, the processing device may be a processing unit or a processor (microprocessor), the communication device may be a communication connection or a communication interface, and the storage device may be a memory.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer or the computing device may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer or the computing device may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer or the computing device may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Overview

The present disclosure describes a space-based distributed radar system for facilitating imaging of areas. Further, the space-based distributed radar system performs multi-static or distributed imaging which includes using multiple antennas or radars simultaneously to form imagery in a coordinated fashion. Distributed imaging offers the promise of new sensor capabilities and multiple order of magnitude improvements in coverage area, coverage speed, and image quality compared to traditional, monolithic radar systems.

The performance of any given radar imaging system is driven primarily by antenna area and available power. For example, the daily coverage rate is directly related to the product of solar area and aperture area. Accordingly, designers strive to maximize solar panel area and antenna size. However, SAR suffers from adverse scaling laws, and growth is eventually limited by thermal, inertial, or beam width constraints. As an example, if the dimensions of an antenna are doubled, the volume and mass increase roughly by a factor of 8, a moment of inertia increases 32×, beamwidth is halved, and the illuminated area on the ground is quartered. Some of these factors are depicted in the chart on FIG. 21.

Distributed imaging, in contrast, has remarkable scaling potential. Each additional satellite increases the antenna and the solar areas of the cluster. This simultaneously lowers the energy cost of forming an image while increasing the energy available for imaging. The resulting quadradic performance increase can be seen in FIG. 21; aperture size and power generation can be increased well above the limits of monolithic systems. Instead of the maximum size, distributed satellites can be optimized for lower costs and ease of production. For example, our design features microstrip antenna arrays, which are manufactured using PCB techniques and are much cheaper than large reflector antennas. By using this and other cost optimizations, distributed radar can lead to approximately 90-99% reductions in imagery cost and approximately 100× improvements in daily collection rate and image collection speed.

As an additional benefit, each node also increases the informational degrees of freedom of the system. This provides the ability to filter out jamming systems, perform nadir imaging, and collect high-resolution digital surface models in a single pass. These unique characteristics can be exploited to greatly improve ATR performance.

The space-based distributed radar system may include a cluster of nanosatellites that operate together in unison. The total number of satellites in each cluster could range from as little as 4 to as many as 100 satellites, although more satellites will provide greater performance. Each satellite is comprised of a standard CubeSat electronics bay and a large flat panel that houses a microstrip antenna and solar array. One possible configuration of the satellite cluster is shown in FIG. 22. The satellites in each cluster fly in the loose ring or pinwheel formation as shown in FIGS. 10-14.

Each satellite in the cluster, images the same location on earth simultaneously, recording the returns from all active transmitters. Loose pulse synchronization is used to align transmit and receive windows.

Further, each transmitter of the satellites uses pseudo-noise waveforms, which removes the need for tight synchronization requirements (at the expense of somewhat greater computational and bandwidth requirements). By using orthogonally coded pseudo-noise waveforms (or waveforms with low correlation), multiple transmitters are able to operate simultaneously without interference.

The diameter of the ring formation in which the cluster of satellites flew is on the order of 50 km making the cluster very sparse. As illustrated in FIGS. 10-14, three-dimensional image formation is possible in this configuration. First, the vertical dimension is focused through range compression. Secondly, the cross-track dimension is focused through the angular diversity of the ring. Lastly, the along-track dimension is focused through the movement of the ring in the along-track dimension, as in traditional SAR imaging. Further, the image formation could be completed either on the ground after downlink, or in orbit. It is anticipated that autofocus algorithms will be sufficient to focus the data using without the need for precision stationkeeping and synchronization, but some type of synchronization or distance measurement could be used.

Further, the cluster of satellites collects a nadir-pointing stripmap from different orientations. Nadir-pointing stripmap imaging offers the greatest collection efficiency and highest image quality. The vertical dimension is resolved through range compression, the cross-track dimension is resolved through the angular diversity of the ring while the along-track dimension is resolved through the movement of the ring along the flight path.

Further, the present disclosure describes a space-based distributed radar system capable of tomographic imaging. The space-based distributed radar system is designed to be capable of three-dimensional tomographic imaging. The space-based distributed radar system provides numerous performance advantages over traditional monostatic/monostatic radar image satellites, including multiple order of magnitude improvements in a coverage area, coverage speed, and image quality.

FIG. 1 is an illustration of an online platform 100 consistent with various embodiments of the present disclosure. By way of non-limiting example, the online platform 100 to facilitate imaging of areas using a space-based distributed radar system may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, sensors 116, a satellite 118 (one of a plurality of satellites 204-214) over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 2300.

Figure 2:
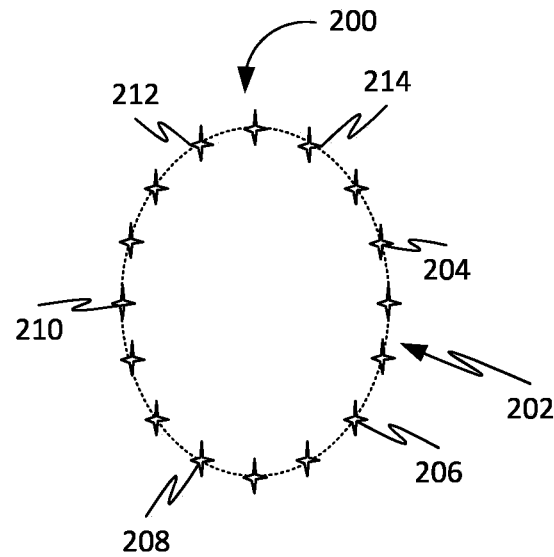
FIG. 2 is a schematic of a space-based distributed radar system for facilitating imaging of areas, in accordance with some embodiments.
Figure 2:
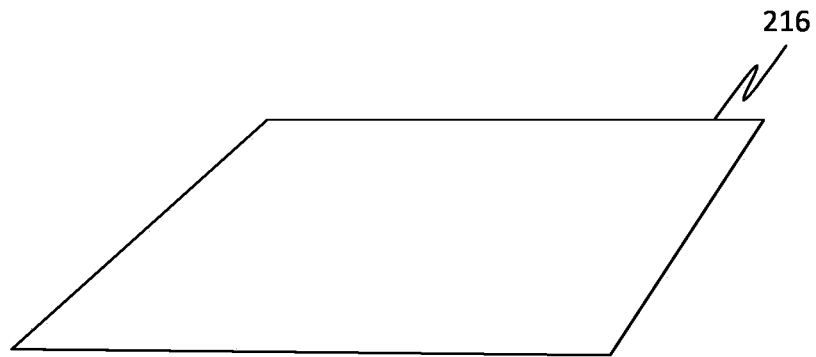

FIG. 2 is a schematic of a space-based distributed radar system 200 for facilitating imaging of areas, in accordance with some embodiments. Further, the space-based distributed radar system 200 may include at least one satellite cluster 202 including a plurality of satellites 204-214. Further, the plurality of satellites 204-214 of each of the at least one satellite cluster 202 flies in a formation. Further, the formation of each of the at least one satellite cluster 202 transitions between a plurality of orientations in relation to an area 216. Further, the plurality of satellites 204-214 may be CubeSats. Further, the plurality of satellites 204-214 may be nanosatellites. Further, the area 216 may be a geographical area of a planet around which the plurality of satellites 204-204 orbit by flying around the planet. Further, the planet may be Earth. Further, each of the plurality of satellites 204-214 may include a bay 302, a panel 304, a transmitter 310, and a receiver 312.

Further, the bay 302 may be a compartment or a housing of the each of the plurality of satellites 204-214.

Further, the panel 304 may be coupled to the bay 302. Further, the panel 304 may include a solar panel array 306 mounted on a first side 308 of the panel 304 and a microstrip antenna array 402 mounted on a second side 404 opposite to the first side 308 of the panel 304. Further, the solar panel array 306 may be configured for powering each of the plurality of satellites 204-214. Further, the solar panel array 306 may be comprised of photovoltaic (PV) cells. Further, the photovoltaic (PV) cells convert solar energy into electrical energy for the powering of each of the plurality of satellites 204-214. Further, the microstrip antenna array 402 may include antennae fabricated using photolithographic techniques on a printed circuit board. Further, the microstrip antenna array 402 may include one or more microstrip antennae consisting of patches of metal foils.

Further, the transmitter 310 may be disposed in the bay 302. Further, the transmitter 310 may be coupled to the microstrip antenna array 402. Further, the transmitter 310 of each of the plurality of satellites 204-214 may be configured for simultaneously transmitting a signal towards the area 216 using the microstrip antenna array 402 in each of the plurality of orientations of each of the at least one satellite cluster 202 based on generating a signal information of the signal. Further, the signal may be a radar (radio detection and ranging) signal comprising one or more radar signal characteristics indicating the signal information associated with the radar signal. Further, the transmitter 310 may be an electronic device that generates the signal information for producing radio waves (signal) using antennae for communication and radiolocation purposes.

Further, the receiver 312 may be disposed in the bay 302. Further, the receiver 312 may be coupled to the microstrip antenna array 402. Further, the receiver 312 of each of the plurality of satellites 204-214 may be configured for receiving a return signal from the area 216 using the microstrip antenna array 402 in each of the plurality of orientations of each of the at least one satellite cluster 202 based on the simultaneous transmitting for producing a return signal information associated with the return signal. Further, the return signal may be indicative of a reflection of the signal by the area. Further, the return signal may be indicative of a reflection of the radar signal. Further, the one or more radar signal characteristics may be changed in the reflection of the radar signal indicating the return signal information associated with the reflection of the radar signal. Further, an image of the area 216 may be formed using the signal information and the return signal information. Further, the receiver 312 may be an electronic device that receives radio waves using the antennae and generates electric signals. Further, the receiving of the return signal may include collecting a nadir-pointing stripmap of the area 216 from each of the plurality of orientations. Further, the image may include a tomographic image of the area 216. Further, the image may be a 2D image, a 3D image, etc.

Figure 5:
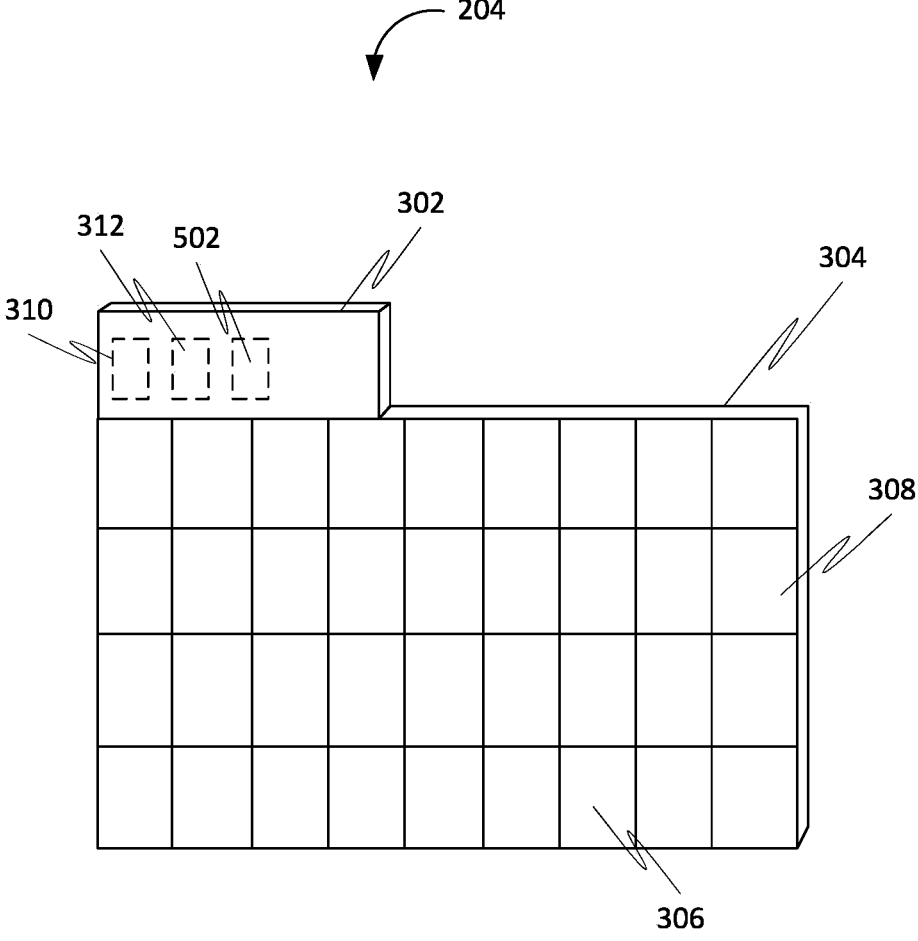
FIG. 5 is a front view of the satellite of the plurality of satellites, in accordance with some embodiments.

Further, in some embodiments, one of the plurality of satellites 204-214 of each of the at least one satellite cluster 202 may include a processing device 502, as shown in FIG. 5, disposed in the bay 302 of one of the plurality of satellites 204-214. Further, the processing device 502 may be communicatively coupled with the transmitter 310 and the receiver 312 of each of the plurality of satellites 204-214. Further, the processing device 502 may be configured for generating the image of the area 216 the signal information and the return signal information.

Further, in an embodiment, the processing device 502 may be configured for determining a range compression for each of the at least one satellite cluster 202 based on the signal from the transmitter 310 of each of the plurality of satellites 204-214 and the return signal from the receiver 312 of each of the plurality of satellites 204-214. Further, a vertical dimension of the image may be resolved through the range compression for the generating of the image.

Further, in an embodiment, the processing device 502 may be configured for determining an angular diversity for each of the at least one satellite cluster 202 based on the signal from the transmitter 310 of each of the plurality of satellites 204-214 and the return signal from the receiver 312 of each of the plurality of satellites 204-214. Further, a cross-track dimension of the image may be resolved through the angular diversity for the generating of the image.

Further, in an embodiment, the processing device 502 may be configured for determining a movement of each of the at least one satellite cluster 202 based on the signal from the transmitter 310 of each of the plurality of satellites 204-214 and the return signal from the receiver 312 of each of the plurality of satellites 204-214. Further, an along track dimension of the image may be resolved through the movement for the generating of the image.

Further, in an embodiment, the processing device 502 may be configured for analyzing the signal information and the return signal information using an autofocus algorithm. Further, the generating of the image may be based on the analyzing of the signal information and the return signal information using an autofocus algorithm. Further, the autofocus algorithm focuses the signal information and the return signal information received from the transmitter 310 and the receiver 312 without a need for synchronizing the transmitter 310 and the receiver 312.

Figure 6:
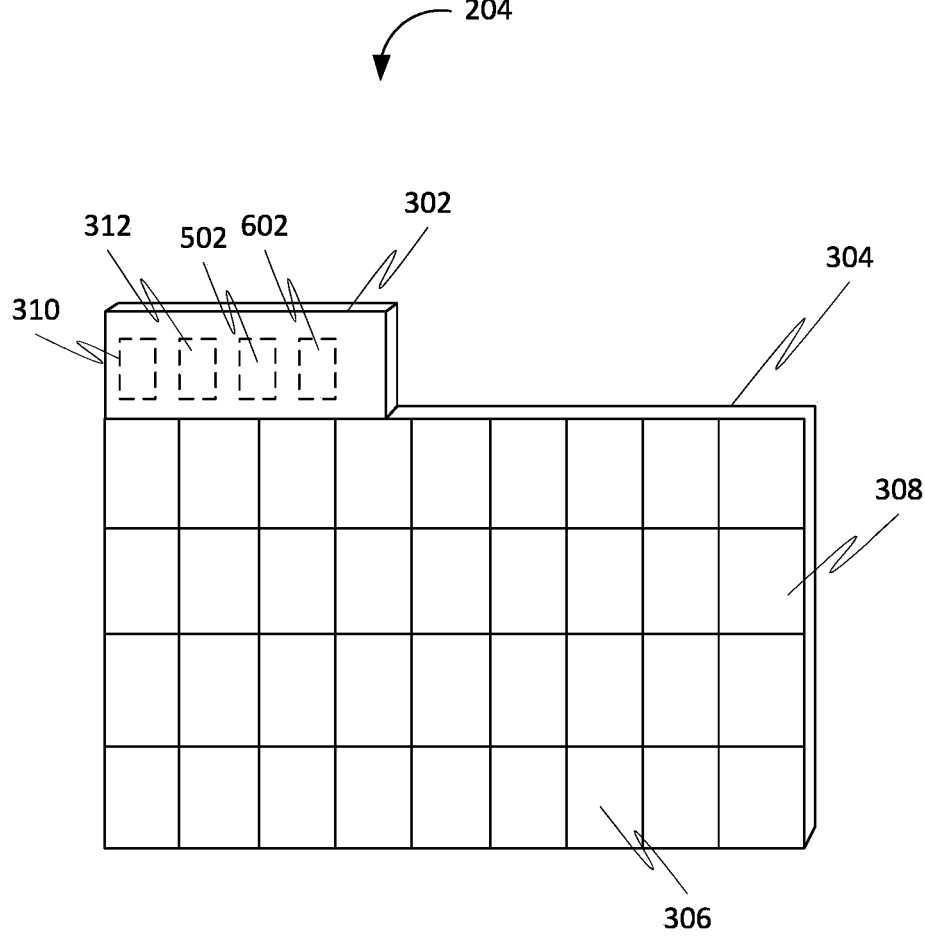
FIG. 6 is a front view of the satellite of the plurality of satellites, in accordance with some embodiments.

Further, in an embodiment, one of the plurality of satellites 204-214 may include a sensor 602, as shown in FIG. 6, disposed in the bay 302 of one of the plurality of satellites 204-214. Further, the sensor 602 may be configured for generating a plurality of measurements of a distance between one of the plurality of satellites 204-214 and each of the plurality of satellites 204-214 based on detecting the distance between one of the plurality of satellites 204-214 and each of the plurality of satellites 204-214. Further, the processing device 502 may be communicatively coupled with the sensor 602. Further, the processing device 502 may be configured for synchronizing the signal information and the return signal information associated with each of the plurality of satellites 204-214 based on the plurality of measurements. Further, the generating of the image may be based on the synchronizing. Further, the sensor 602 may be a position sensor.

Figure 7:
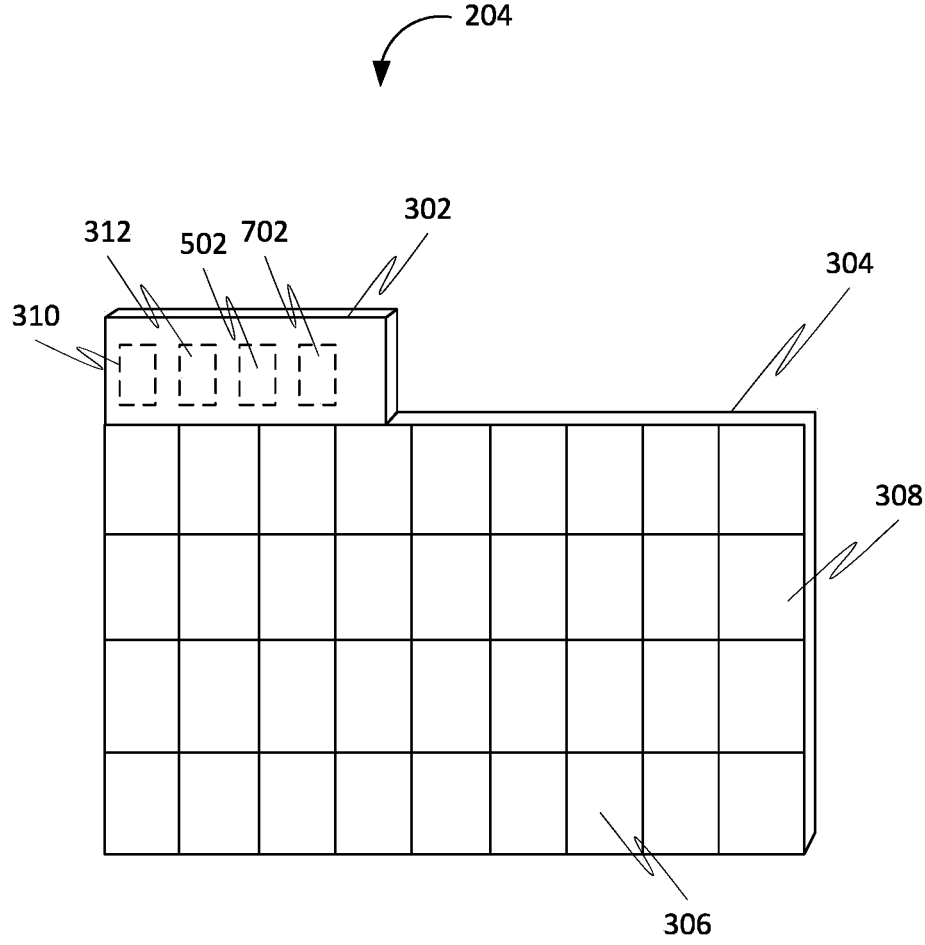
FIG. 7 is a front view of the satellite of the plurality of satellites, in accordance with some embodiments.

Further, in an embodiment, one of the plurality of satellites 204-214 of each of the at least one satellite cluster 202 may include a storage device 702, as shown in FIG. 7, disposed in the bay 302 of one of the plurality of satellites 204-214. Further, the storage device 702 may be communicatively coupled with the processing device 502. Further, the storage device 702 may be configured for storing the image.

Further, in an embodiment, the simultaneously transmitting of the signal to the area 216 using the microstrip antenna array 402 in each of the plurality of orientations may include simultaneously transmitting the signal to the area 216 using the microstrip antenna array 402 in each of the plurality of orientations in a transmit window. Further, the transmit window may be a time duration in which the transmitter 310 may be allowed for the simultaneous transmitting of the signal. Further, the receiving of the return signal from the area 216 using the microstrip antenna array 402 in each of the plurality of orientations based on the simultaneous transmitting may include receiving the return signal from the area 216 using the microstrip antenna array 402 in each of the plurality of orientations in a receive window based on the simultaneous transmitting. Further, the receive window may be a time duration in which the receiver 312 allowed for the receiving of the return signal. Further, the processing device 502 may be configured for implementing a loose pulse synchronization for the transmitter 310 and the receiver 312 for each of the plurality of satellites 204-214. Further, the implementing of the loose pulse synchronization aligns the transmit window and the receive window for preventing overlapping between the transmit window and the receive window.

Figure 8:
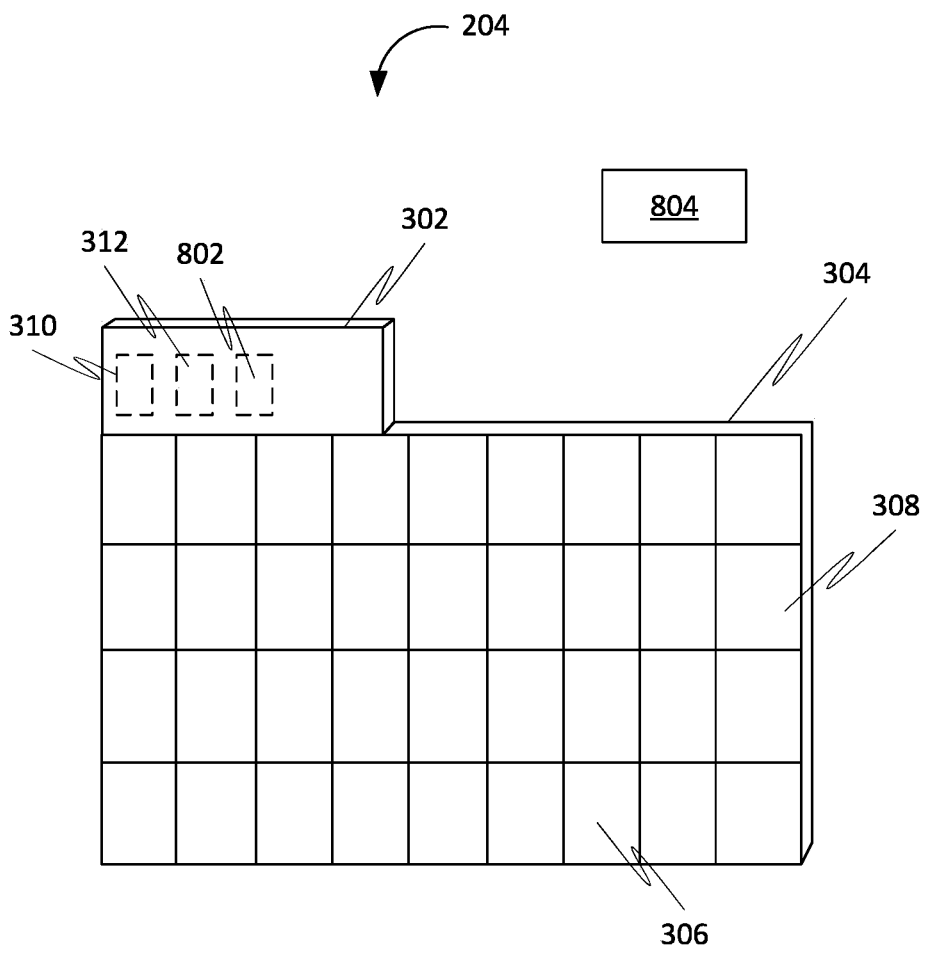
FIG. 8 is a front view of the satellite of the plurality of satellites, in accordance with some embodiments.

Further, in some embodiments, one of the plurality of satellites 204-214 may include a communication device 802, as shown in FIG. 8, disposed in the bay 302 of one of the plurality of satellites 204-214. Further, the communication device 802 may be communicatively coupled with the transmitter 310 and the receiver 312 of each of the plurality of satellites 204-214. Further, the communication device 802 may be configured for transmitting the signal information and the return signal information of each of the plurality of satellites 204-214 to at least one user device 804, as shown in FIG. 8. Further, the at least one user device 804 may be a computing device.

Figure 9:
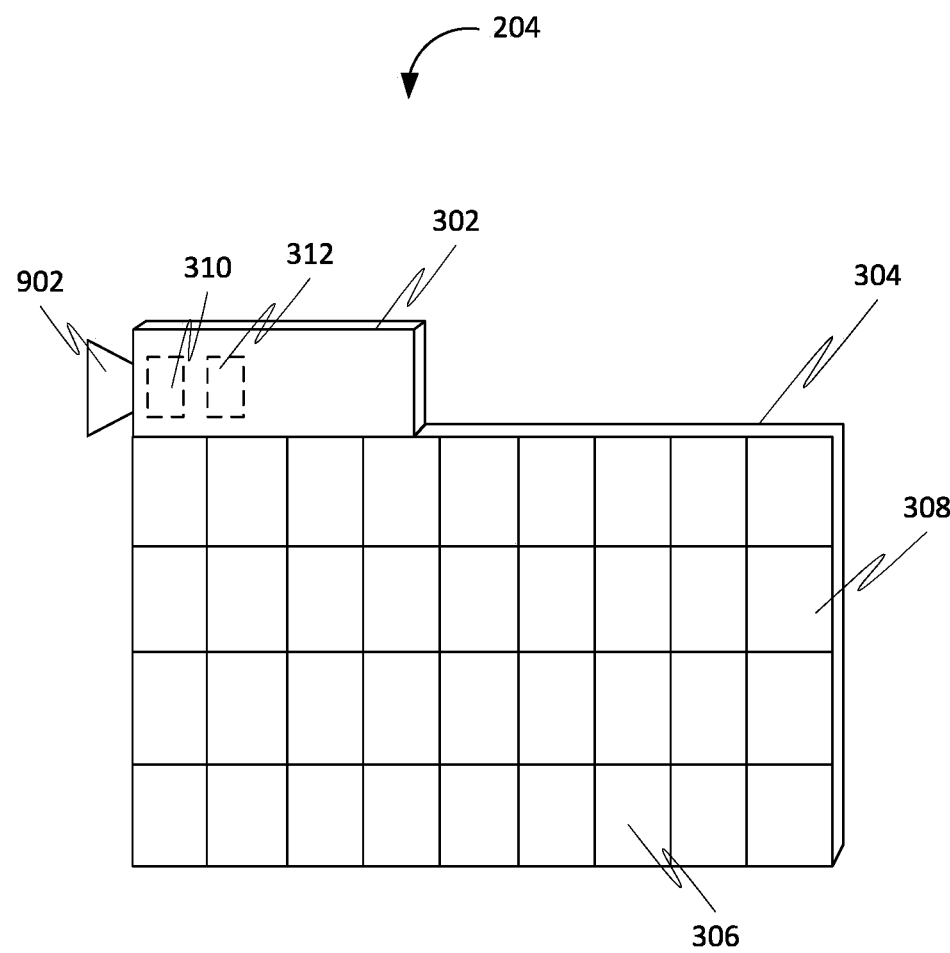
FIG. 9 is a front view of the satellite of the plurality of satellites, in accordance with some embodiments.

Further, in some embodiments, each of the plurality of satellites 204-214 may include a propulsion system 902, as shown in FIG. 9, mounted on the bay 302. Further, the propulsion system 902 may be configured for propelling at least one of the plurality of satellites 204-214 in one of a plurality of directions in relation to a flying direction of at least one of the plurality of satellites 204-214. Further, the transitioning of the formation of each of the at least one satellite cluster 202 between the plurality of orientations may be based on the propelling. Further, the propulsion system 902 may include a thruster, a chemical propulsion, an electric propulsion, etc.

Further, in some embodiments, the transmitter 310 of each of the plurality of satellites 204-214 may be configured for implementing one of the plurality of orthogonally coded pseudo-noise waveforms. Further, the simultaneous transmitting of the signal may be further based on the implementing of one of the plurality of orthogonally coded pseudo-noise waveforms.

Further, in some embodiments, the formation of the at least one satellite cluster 202 may be a ring formation. Further, in some embodiments, the formation of the at least one satellite cluster 202 may be a pinwheel formation.

Further, in an embodiment, a diameter of the ring formation of the at least one satellite cluster 202 may be 50 kilometers.

Further, in some embodiments, a number of the plurality of satellites 204-214 in each of the at least one satellite cluster 202 ranges between 4 and 100.

Figure 3:
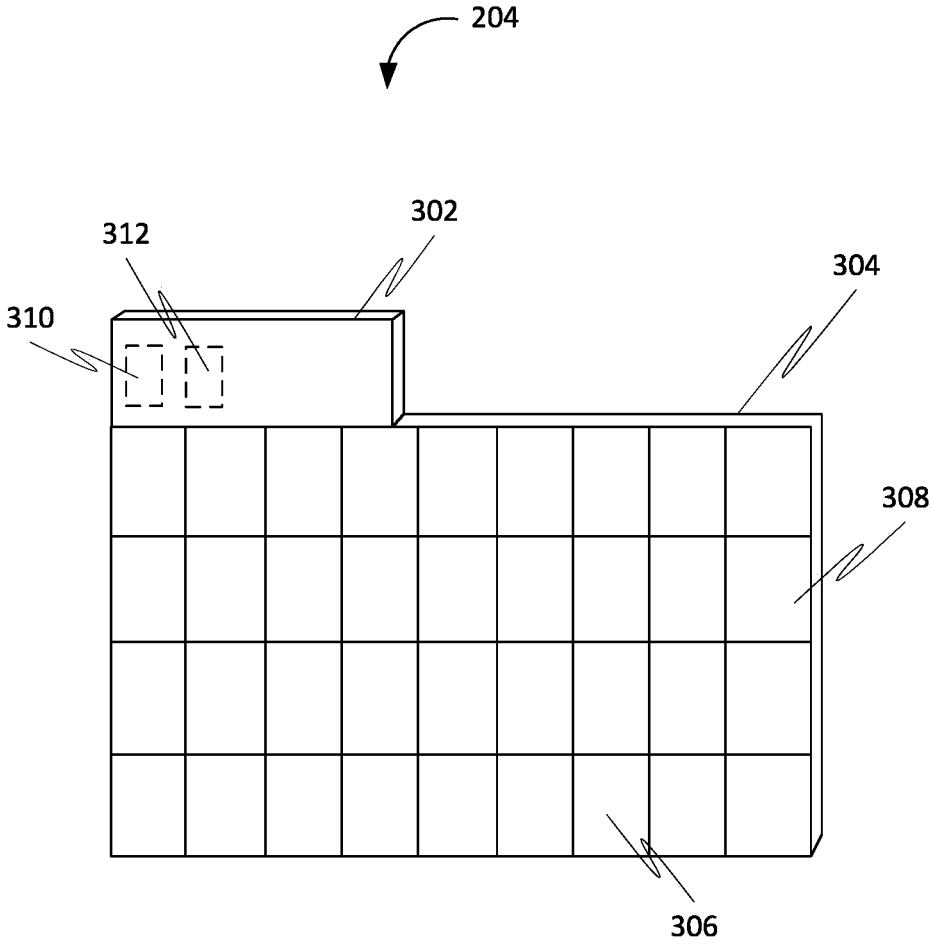
FIG. 3 is a front view of the satellite of the plurality of satellites, in accordance with some embodiments.

FIG. 3 is a front view of the satellite 204 of the plurality of satellites 204-214, in accordance with some embodiments.

Figure 4:
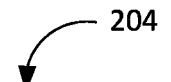
FIG. 4 is a rear view of the satellite of the plurality of satellites, in accordance with some embodiments.
Figure 4:
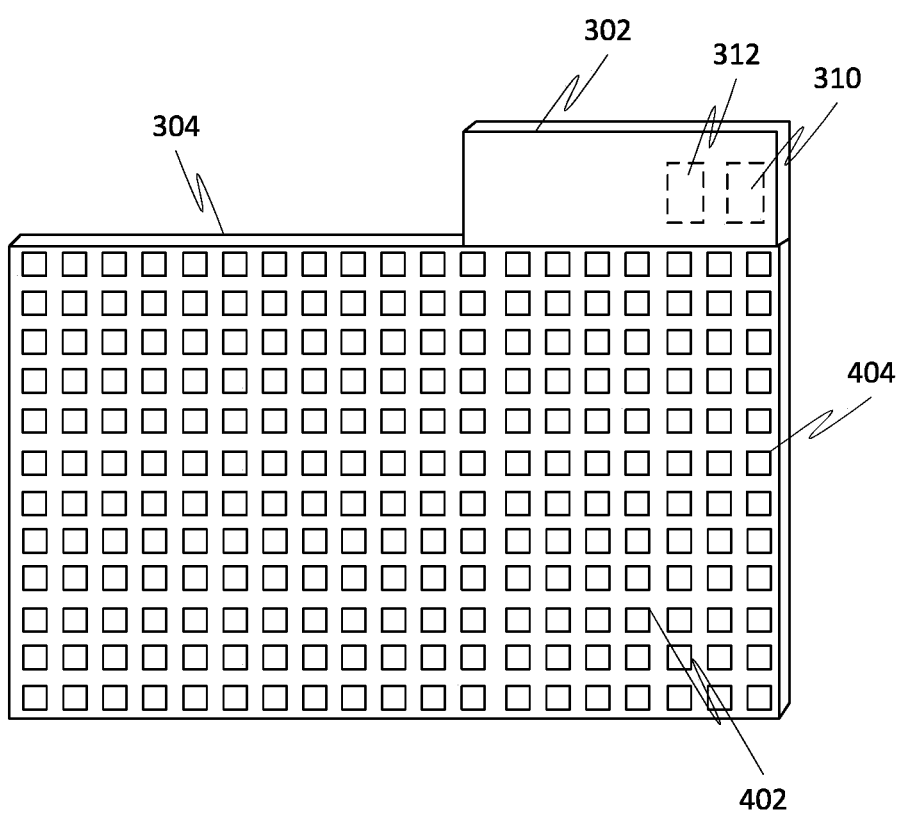

FIG. 4 is a rear view of the satellite 204 of the plurality of satellites 204-214, in accordance with some embodiments.

FIG. 5 is a front view of the satellite 204 of the plurality of satellites 204-214, in accordance with some embodiments.

FIG. 6 is a front view of the satellite 204 of the plurality of satellites 204-214, in accordance with some embodiments.

FIG. 7 is a front view of the satellite 204 of the plurality of satellites 204-214, in accordance with some embodiments.

FIG. 8 is a front view of the satellite 204 of the plurality of satellites 204-214, in accordance with some embodiments.

FIG. 9 is a front view of the satellite 204 of the plurality of satellites 204-214, in accordance with some embodiments.

Figure 10:
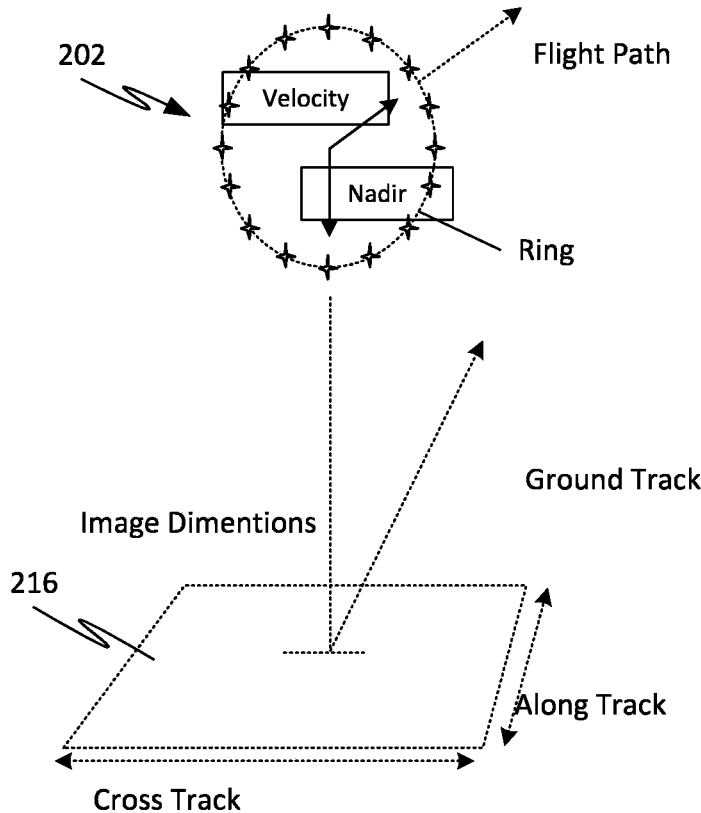
FIG. 10 illustrates a first orientation of the formation of the at least one satellite cluster, in accordance with some embodiments.

FIG. 10 illustrates a first orientation of the formation of the at least one satellite cluster 202, in accordance with some embodiments.

Figure 11:
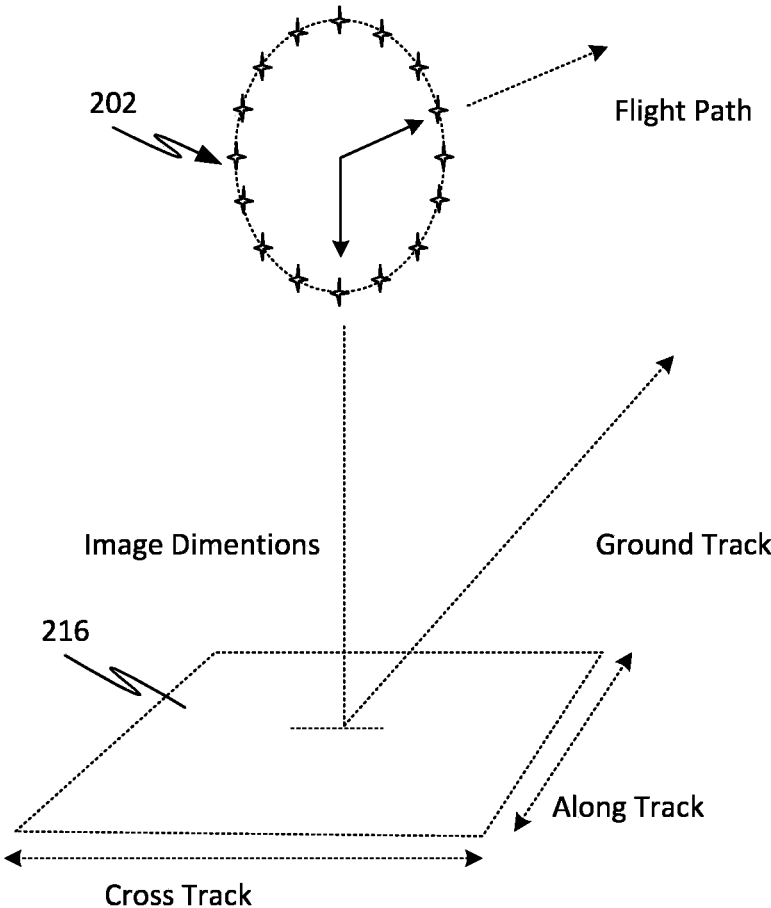
FIG. 11 illustrates a second orientation of the formation of the at least one satellite cluster, in accordance with some embodiments.

FIG. 11 illustrates a second orientation of the formation of the at least one satellite cluster 202, in accordance with some embodiments.

Figure 12:
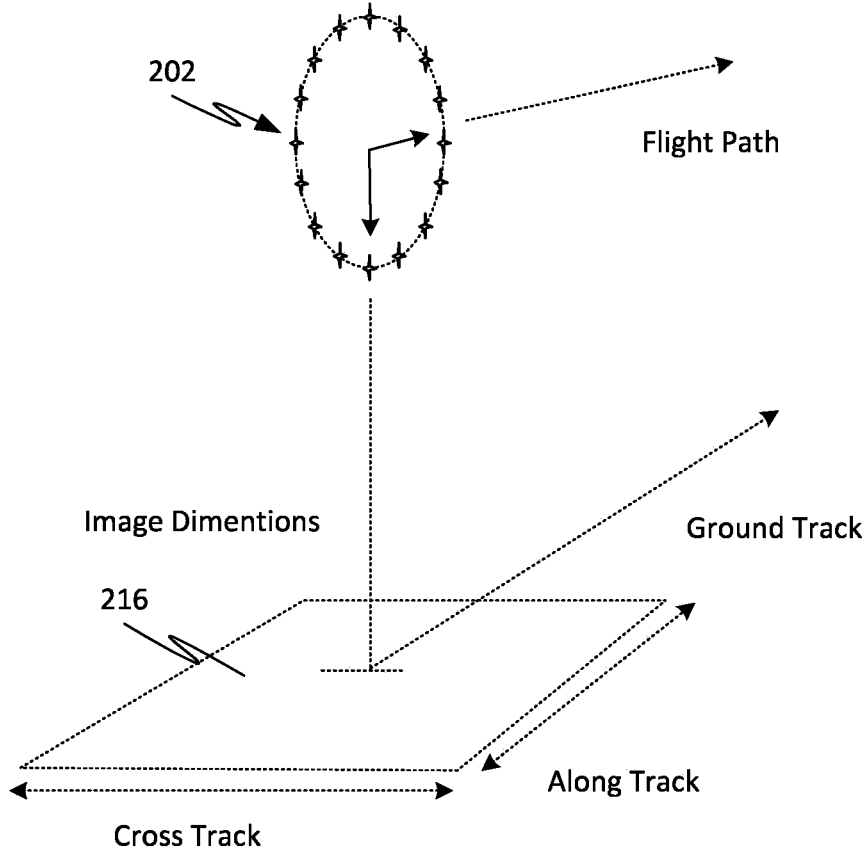
FIG. 12 illustrates a third orientation of the formation of the at least one satellite cluster, in accordance with some embodiments.

FIG. 12 illustrates a third orientation of the formation of the at least one satellite cluster 202, in accordance with some embodiments.

Figure 13:
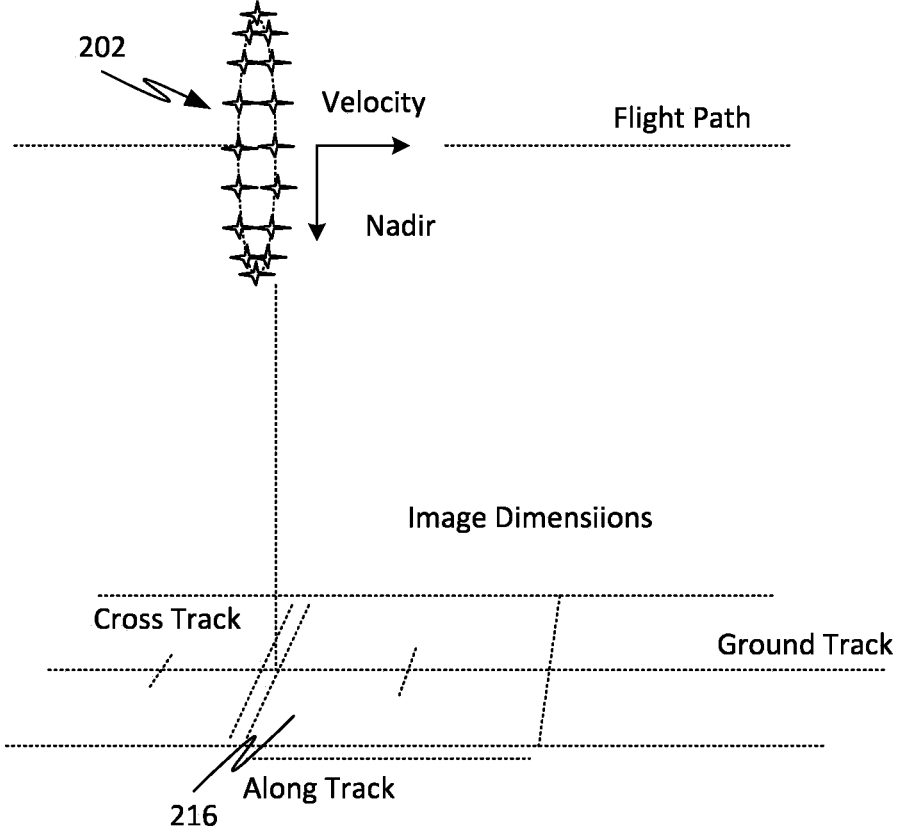
FIG. 13 illustrates a fourth orientation of the formation of the at least one satellite cluster, in accordance with some embodiments.

FIG. 13 illustrates a fourth orientation of the formation of the at least one satellite cluster 202, in accordance with some embodiments.

Figure 14:
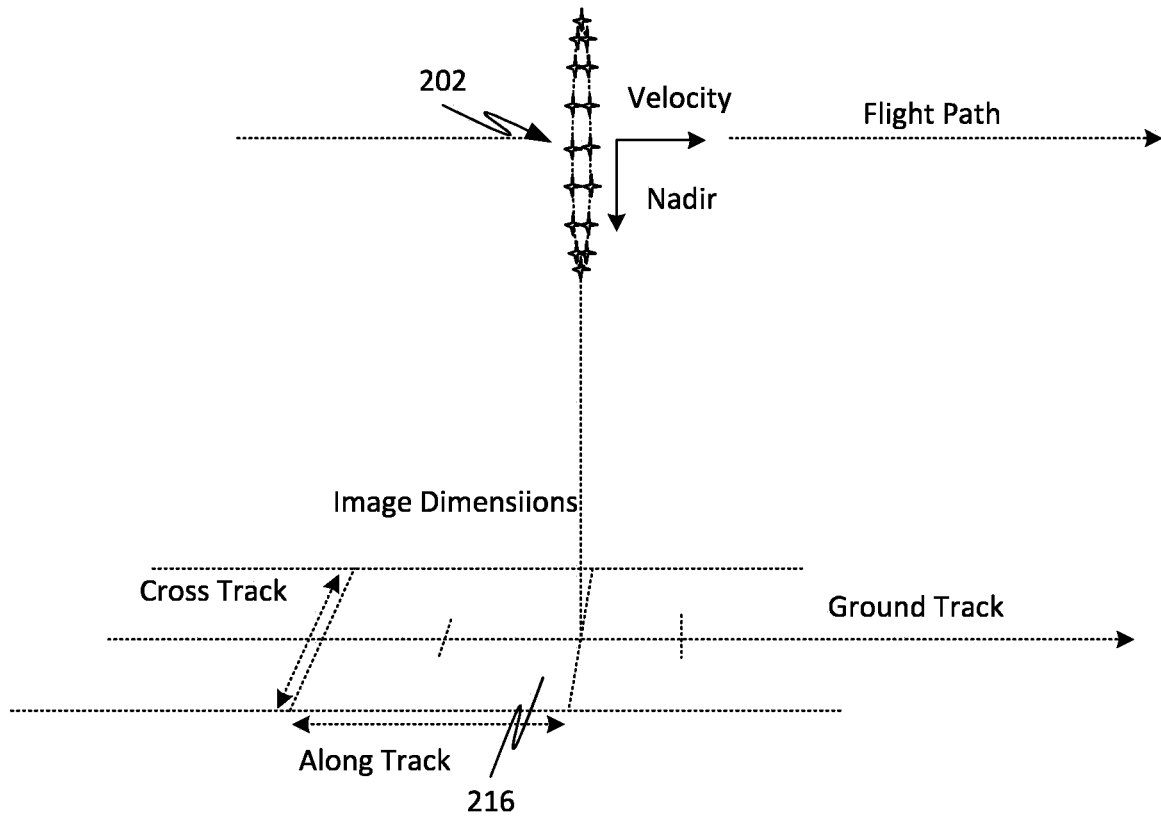
FIG. 14 illustrates a fifth orientation of the formation of the at least one satellite cluster, in accordance with some embodiments.

FIG. 14 illustrates a fifth orientation of the formation of the at least one satellite cluster 202, in accordance with some embodiments.

Figure 15:
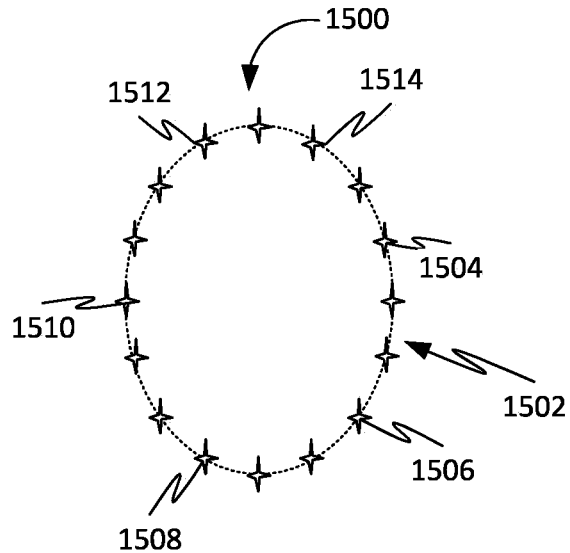
FIG. 15 is a schematic of a space-based distributed radar system for facilitating imaging of areas, in accordance with some embodiments.
Figure 15:
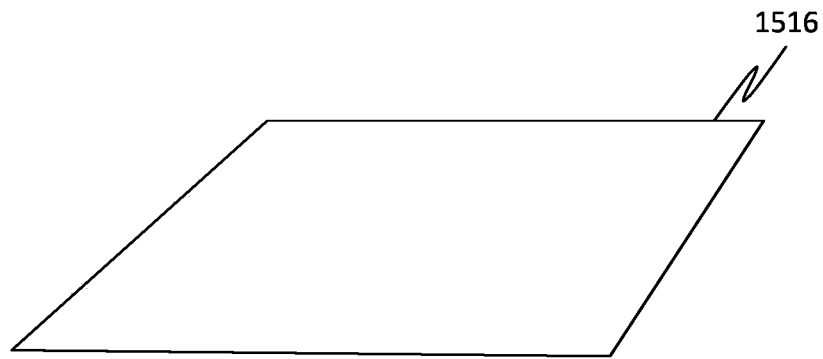

FIG. 15 is a schematic of a space-based distributed radar system 1500 for facilitating imaging of areas, in accordance with some embodiments. Further, the space-based distributed radar system 1500 may include at least one satellite cluster 1502 including a plurality of satellites 1504-1514. Further, the plurality of satellites 1504-1514 of each of the at least one satellite cluster 1502 flies in a formation. Further, the formation of each of the at least one satellite cluster 1502 transitions between a plurality of orientations in relation to an area 1516. Further, each of the plurality of satellites 1504-1514 may include a bay 1602, a panel 1604, a transmitter 1610, and a receiver 1612.

Further, the panel 1604 may be coupled to the bay 1602. Further, the panel 1604 may include a solar panel array 1606 mounted on a first side 1608 of the panel 1604 and a microstrip antenna array 1702 mounted on a second side 1704 opposite to the first side 1608 of the panel 1604. Further, the solar panel array 1606 may be configured for powering each of the plurality of satellites 1504-1514.

Further, the transmitter 1610 may be disposed in the bay 1602. Further, the transmitter 1610 may be coupled to the microstrip antenna array 1702. Further, the transmitter 1610 of each of the plurality of satellites 1504-1514 may be configured for simultaneously transmitting a signal towards the area 1516 using the microstrip antenna array 1702 in each of the plurality of orientations of each of the at least one satellite cluster 1502 based on generating a signal information of the signal.

Further, the receiver 1612 may be disposed in the bay 1602. Further, the receiver 1612 may be coupled to the microstrip antenna array 1702. Further, the receiver 1612 of each of the plurality of satellites 1504-1514 may be configured for receiving a return signal from the area 1516 using the microstrip antenna array 1702 in each of the plurality of orientations of each of the at least one satellite cluster 1502 based on the simultaneous transmitting for producing a return signal information associated with the return signal. Further, an image of the area 1516 may be formed the signal information and the return signal information. Further, one of the plurality of satellites 1504-1514 of each of the at least one satellite cluster 1502 may include a processing device 1614 disposed in the bay 1602 of one of the plurality of satellites 1504-1514. Further, the processing device 1614 may be communicatively coupled with the transmitter 1610 and the receiver 1612 of each of the plurality of satellites 1504-1514. Further, the processing device 1614 may be configured for generating the image of the area 1516 the signal information and the return signal information.

Further, in some embodiments, the processing device 1614 may be further configured for determining a range compression for each of the at least one satellite cluster 1502 based on the signal from the transmitter 1610 of each of the plurality of satellites 1504-1514 and the return signal from the receiver 1612 of each of the plurality of satellites 1504-1514. Further, a vertical dimension of the image may be resolved through the range compression for the generating of the image.

Further, in some embodiments, the processing device 1614 further may be configured for determining an angular diversity for each of the at least one satellite cluster 1502 based on the signal from the transmitter 1610 of each of the plurality of satellites 1504-1514 and the return signal from the receiver 1612 of each of the plurality of satellites 1504-1514. Further, a cross-track dimension of the image may be resolved through the angular diversity for the generating of the image.

Further, in some embodiments, the processing device 1614 further may be configured for determining a movement of each of the at least one satellite cluster 1502 based on the signal from the transmitter 1610 of each of the plurality of satellites 1504-1514 and the return signal from the receiver 1612 of each of the plurality of satellites 1504-1514. Further, an along track dimension of the image may be resolved through the movement for the generating of the image.

Figure 16:
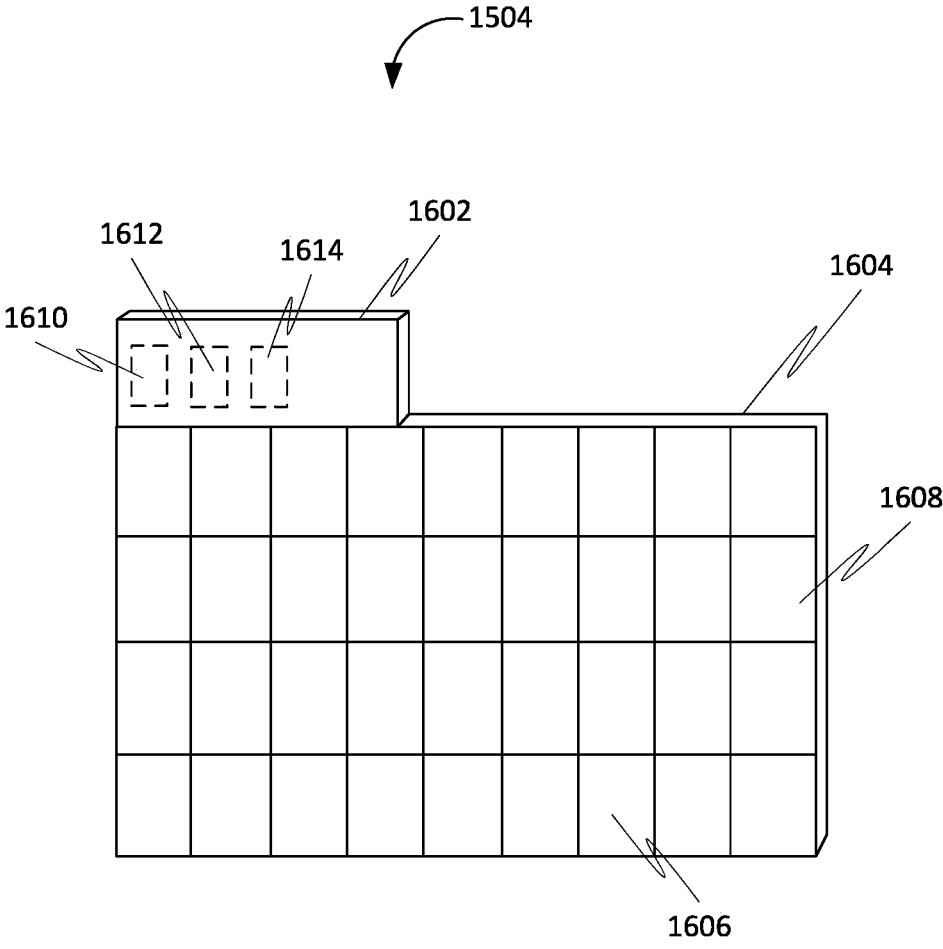
FIG. 16 is a front view of the satellite of the plurality of satellites, in accordance with some embodiments.

FIG. 16 is a front view of the satellite 1504 of the plurality of satellites 1504-1514, in accordance with some embodiments.

Figure 17:
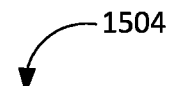
FIG. 17 is a rear view of the satellite of the plurality of satellites, in accordance with some embodiments.
Figure 17:
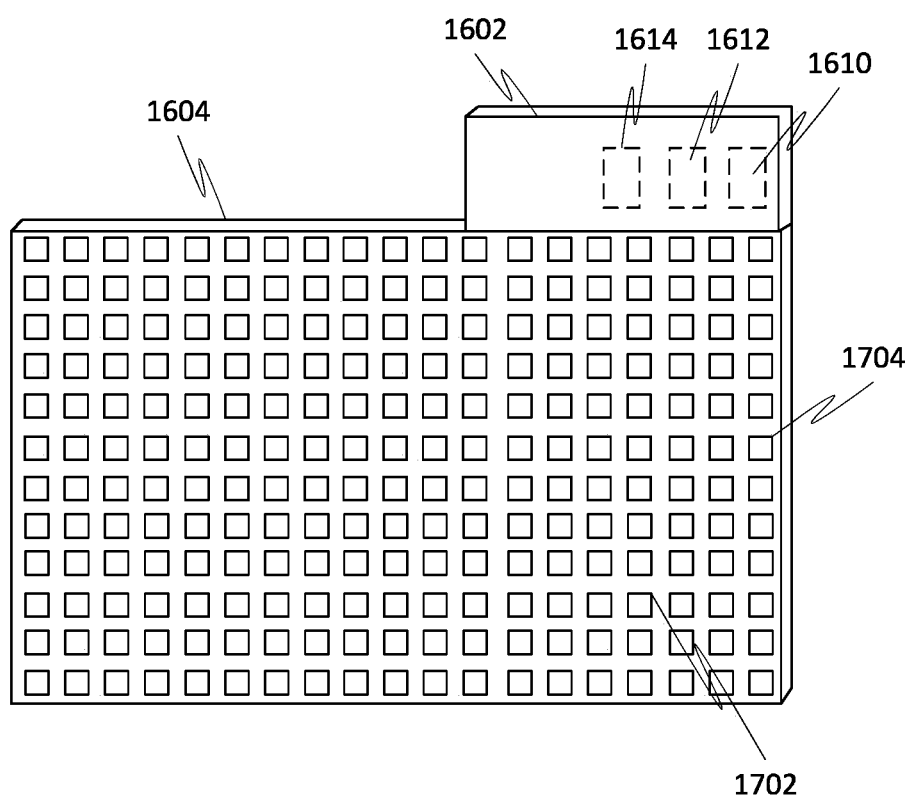

FIG. 17 is a rear view of the satellite 1504 of the plurality of satellites 1504-1514, in accordance with some embodiments.

Figure 18:
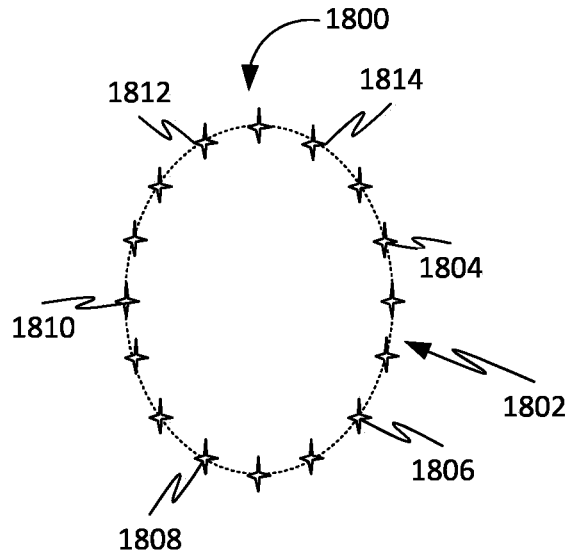
FIG. 18 is a schematic of a space-based distributed radar system for facilitating imaging of areas, in accordance with some embodiments.
Figure 18:
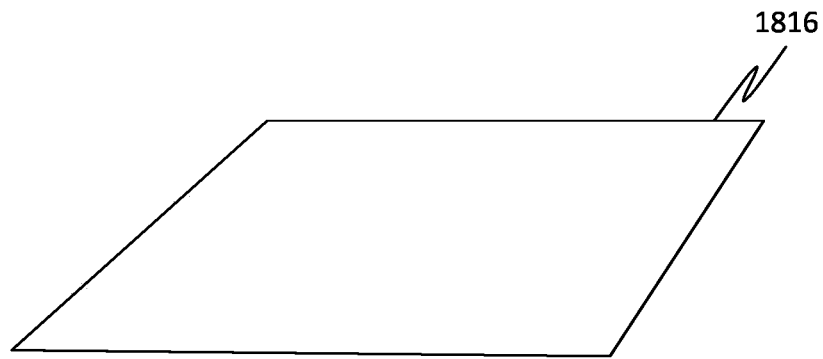

FIG. 18 is a schematic of a space-based distributed radar system 1800 for facilitating imaging of areas, in accordance with some embodiments. Further, the space-based distributed radar system 1800 may include at least one satellite cluster 1802 including a plurality of satellites 1804-1814. Further, the plurality of satellites 1804-1814 of each of the at least one satellite cluster 1802 flies in a formation. Further, the formation of each of the at least one satellite cluster 1802 transitions between a plurality of orientations in relation to an area 1816. Further, each of the plurality of satellites 1804-1814 may include a bay 1902, a panel 1904, a transmitter 1910, and a receiver 1912.

Further, the panel 1904 may be coupled to the bay 1902. Further, the panel 1904 may include a solar panel array 1906 mounted on a first side 1908 of the panel 1904 and a microstrip antenna array 2002 mounted on a second side 2004 opposite to the first side 1908 of the panel 1904. Further, the solar panel array 1906 may be configured for powering each of the plurality of satellites 1804-1814.

Further, the transmitter 1910 may be disposed in the bay 1902. Further, the transmitter 1910 may be coupled to the microstrip antenna array 2002. Further, the transmitter 1910 of each of the plurality of satellites 1804-1814 may be configured for simultaneously transmitting a signal towards the area 1816 using the microstrip antenna array 2002 in each of the plurality of orientations of each of the at least one satellite cluster 1802 based on generating a signal information of the signal. Further, the transmitter 1910 of each of the plurality of satellites 1804-1814 may be configured for implementing one of the plurality of orthogonally coded pseudo-noise waveforms. Further, the simultaneous transmitting of the signal may be based on the implementing of one of the plurality of orthogonally coded pseudo-noise waveforms.

Further, the receiver 1912 may be disposed in the bay 1902. Further, the receiver 1912 may be coupled to the microstrip antenna array 2002. Further, the receiver 1912 of each of the plurality of satellites 1804-1814 may be configured for receiving a return signal from the area 1816 using the microstrip antenna array 2002 in each of the plurality of orientations of each of the at least one satellite cluster 1802 based on the simultaneous transmitting for producing a return signal information associated with the return signal. Further, an image of the area 1816 may be formed the signal information and the return signal information.

Figure 19:
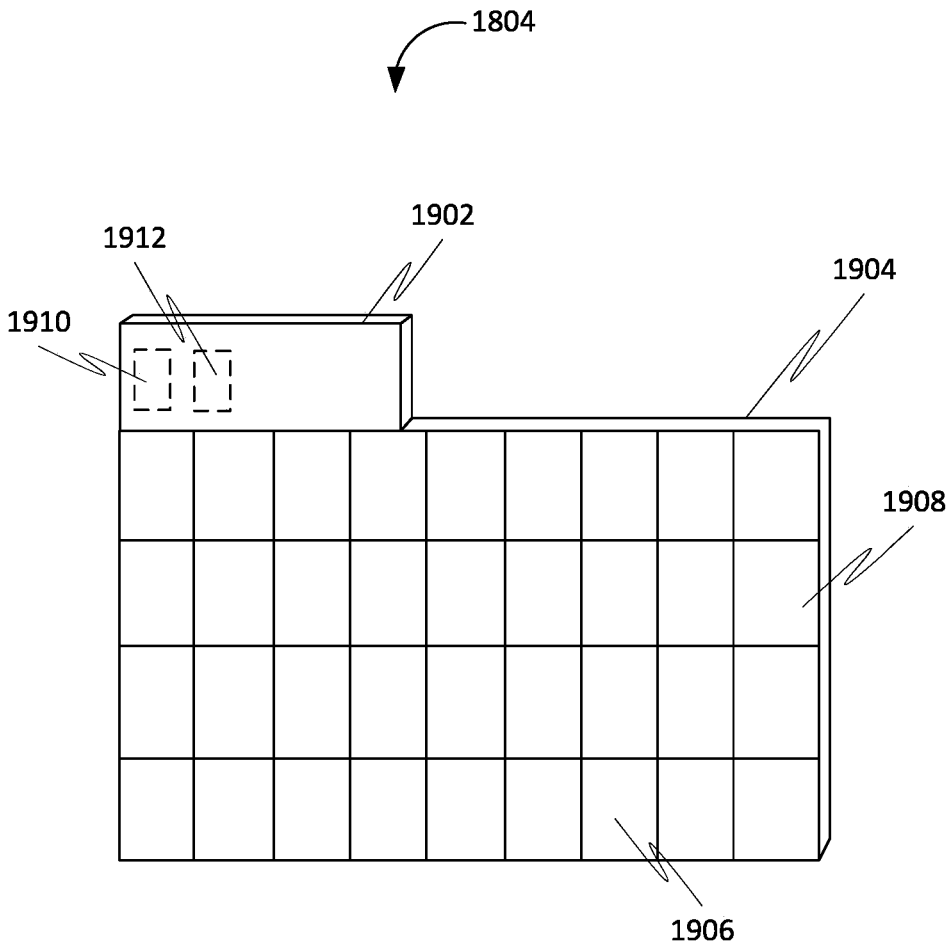
FIG. 19 is a front view of the satellite of the plurality of satellites, in accordance with some embodiments.

FIG. 19 is a front view of the satellite 1804 of the plurality of satellites 1804-1814, in accordance with some embodiments.

Figure 20:
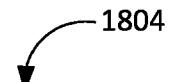
FIG. 20 is a rear view of the satellite of the plurality of satellites, in accordance with some embodiments.
Figure 20:
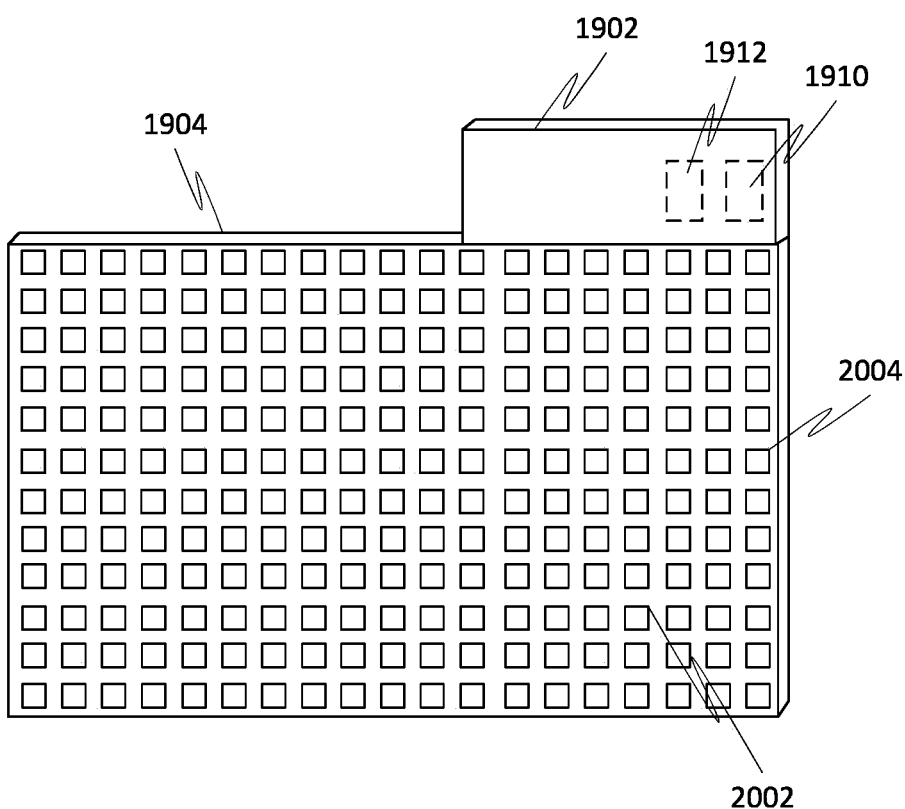

FIG. 20 is a rear view of the satellite 1804 of the plurality of satellites 1804-1814, in accordance with some embodiments.

Figure 21:
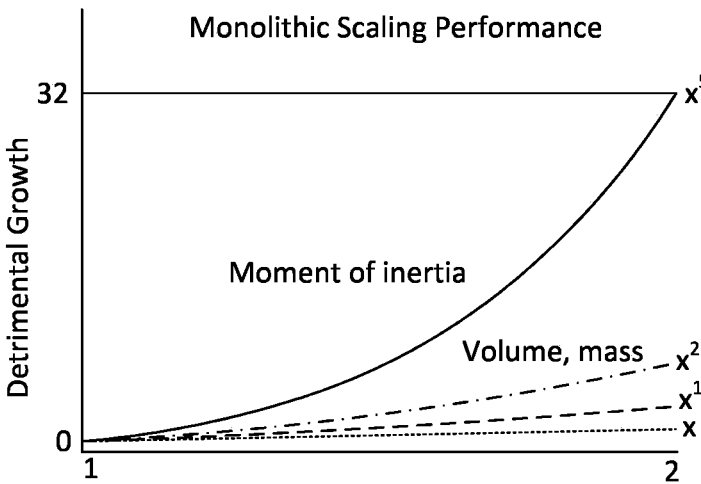
FIG. 21 illustrates a comparison between a distributed scaling performance of a space-based distributed radar system for facilitating imaging of areas and a monolithic scaling performance of a system, in accordance with some embodiments.
Figure 21:
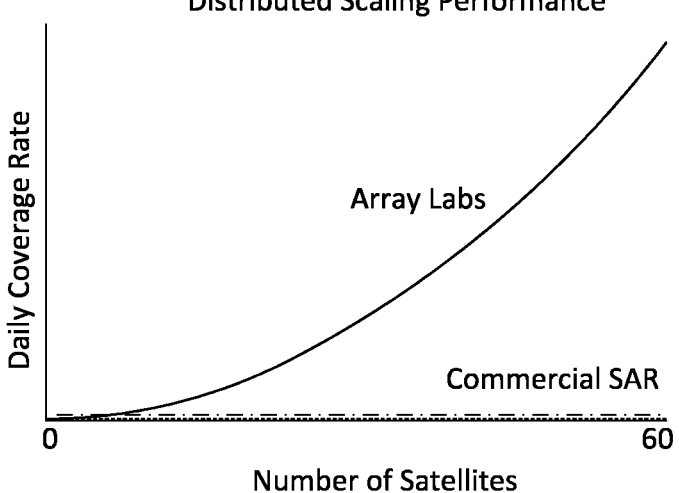

FIG. 21 illustrates a comparison between a distributed scaling performance of a space-based distributed radar system for facilitating imaging of areas and a monolithic scaling performance of a system, in accordance with some embodiments.

FIG. 22 is a table 2200 of one or more technical data associated with a plurality of satellites of a space-based distributed radar system for facilitating imaging of areas, in accordance with some embodiments.

Figure 23:
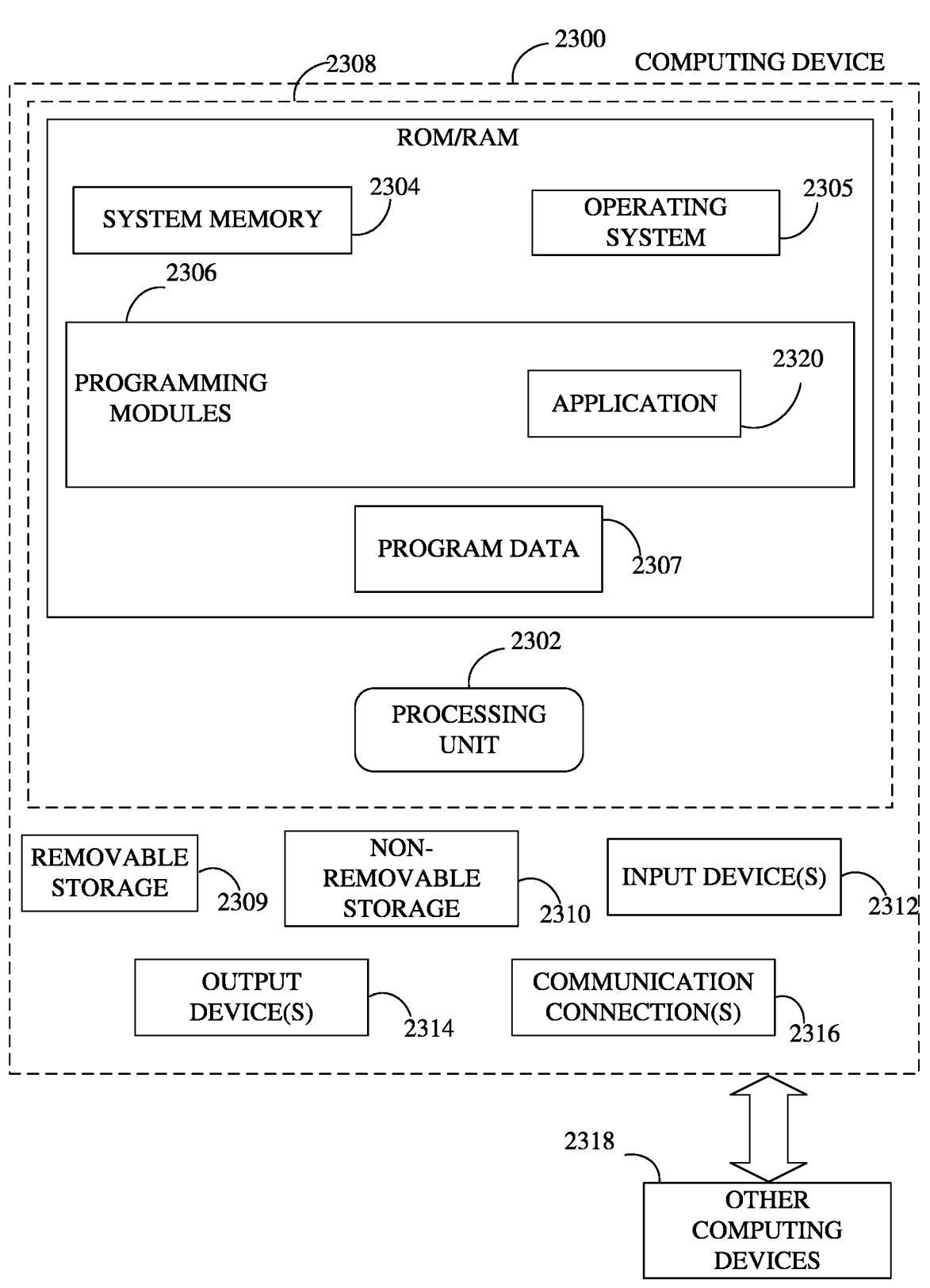
FIG. 23 is a block diagram of a computing device for implementing the methods disclosed herein, in accordance with some embodiments.

With reference to FIG. 23, a system consistent with an embodiment of the disclosure may include a computing device or cloud service, such as computing device 2300. In a basic configuration, computing device 2300 may include at least one processing unit 2302 and a system memory 2304. Depending on the configuration and type of computing device, system memory 2304 may comprise, but is not limited to, volatile (e.g., random-access memory (RAM)), non-volatile (e.g., read-only memory (ROM)), flash memory, or any combination. System memory 2304 may include operating system 2305, one or more programming modules 2306, and may include a program data 2307. Operating system 2305, for example, may be suitable for controlling computing device 2300's operation. In one embodiment, programming modules 2306 may include image-processing module, machine learning module, signal processing module, etc. Furthermore, embodiments of the disclosure may be practiced in conjunction with a graphics library, other operating systems, or any other application program and is not limited to any particular application or system. This basic configuration is illustrated in FIG. 23 by those components within a dashed line 2308.

Computing device 2300 may have additional features or functionality. For example, computing device 2300 may also include additional data storage devices (removable and/or non-removable) such as, for example, magnetic disks, optical disks, or tape. Such additional storage is illustrated in FIG. 23 by a removable storage 2309 and a non-removable storage 2310. Computer storage media may include volatile and non-volatile, removable and non-removable media implemented in any method or technology for storage of information, such as computer-readable instructions, data structures, program modules, or other data. System memory 2304, removable storage 2309, and non-removable storage 2310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2300. Any such computer storage media may be part of device 2300. Computing device 2300 may also have input device(s) 2312 such as a keyboard, a mouse, a pen, a sound input device, a touch input device, a location sensor, a camera, a biometric sensor, etc. Output device(s) 2314 such as a display, speakers, a printer, etc. may also be included. The aforementioned devices are examples and others may be used.

Computing device 2300 may also contain a communication connection 2316 that may allow device 2300 to communicate with other computing devices 2318, such as over a network in a distributed computing environment, for example, an intranet or the Internet. Communication connection 2316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2304, including operating system 2305. While executing on processing unit 2302, programming modules 2306 (e.g., application 2320 such as a media player) may perform processes including, for example, one or more stages of methods, algorithms, systems, applications, servers, databases as described above. The aforementioned process is an example, and processing unit 2302 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A satellite cluster to obtain image data for producing an image of an area of earth, the satellite cluster comprising:
a plurality of satellites arranged in a formation to travel along a flight path over the area, wherein:
at least three satellites of the plurality of satellites define a plane that is orthogonally oriented to the area,
the formation has a center that moves along the flight path over the area, and
an orientation of the formation changes with respect to the center as the formation moves along the flight path while the plane remains orthogonally oriented to the area; and
a first satellite of the plurality of satellites comprises:
a bay;
a panel coupled to the bay;
an array of photovoltaic cells disposed on a first side of the panel to provide power for the first satellite;
an antenna array disposed on a second side of the panel opposite the first side;
a transmitter disposed in the bay and coupled to the antenna array;
a receiver disposed in the bay and coupled to the antenna array; and
a processing device disposed in the bay and communicatively coupled to the transmitter and receiver, the processing device configured to:
operate the transmitter to transmit a first plurality of radar signals from the antenna array toward the area while the orientation of the formation changes with respect to the center as the formation travels along the flight path, wherein the first plurality of radar signals are orthogonally coded to radar signals transmitted from other satellites of the plurality of satellites; and
receive, from the receiver, a second plurality of radar signals returned from the area in response to transmission of at least the first plurality of radar signals, the second plurality of radar signals comprising a first portion of radar signals representative of reflections of the first plurality of radar signals from the area and a second portion of radar signals representative of reflections from the area of a third plurality of radar signals transmitted toward the area by at least one other satellite of the plurality of satellites.

2. The satellite cluster of claim 1, wherein a shape of the formation is a ring or pinwheel having a diameter on the order of 50 km.

3. The satellite cluster of claim 1, wherein the first satellite further comprises:
a sensor disposed in the bay to detect at least one distance between the first satellite and at least one other satellite of the plurality of satellites.

4. The satellite cluster of claim 3, wherein the processing device is further configured to:
generate the image data for the image of the area based, at least in part, on the at least one distance.

5. The satellite cluster of claim 1, wherein the processing device is further configured to:
determine a range compression for at least the first satellite for resolving a vertical dimension of the image of the area, the range compression determined based at least on the first plurality of radar signals and the second plurality of radar signals;
determine an angular diversity for at least the first satellite for resolving a cross-track dimension of the image of the area, the angular diversity determined based at least on the first plurality of radar signals and the second plurality of radar signals; and
determine a movement of at least the first satellite along the flight path for resolving an along-track dimension of the image of the area, the movement determined based at least on the first plurality of radar signals and the second plurality of radar signals.

6. The satellite cluster of claim 1, wherein the processing device is further configured to:
operate the transmitter of the first satellite to transmit the first plurality of radar signals in a transmit window; and
operate the receiver of the first satellite to receive the second plurality of radar signals in a receive window that does not overlap with the transmit window.

7. The satellite cluster of claim 1, wherein the first satellite further comprises:
a communication device disposed in the bay and communicatively coupled to the antenna array and the receiver to communicate with each remaining satellite of the plurality of satellites in the satellite cluster and with a remote device.

8. A satellite to obtain image data for producing an image of an area of earth, the satellite comprising:
a bay;
a panel coupled to the bay;
an array of photovoltaic cells disposed on a first side of the panel to provide power for the satellite;
an antenna array disposed on a second side of the panel opposite the first side;
a transmitter disposed in the bay and coupled to the antenna array;
a receiver disposed in the bay and coupled to the antenna array; and
a processing device disposed in the bay and communicatively coupled to the transmitter and receiver, the processing device configured to:
operate the satellite cooperatively with a plurality of satellites arranged in a formation for imaging an area of the earth while the formation travels along a flight path over the area, the formation having a center that moves along the flight path over the area, wherein at least three satellites in the formation define a plane that is orthogonally oriented to the area while the formation travels along the flight path;
operate the transmitter to transmit a first plurality of radar signals from the antenna array toward the area while an orientation of the formation changes with respect to the center as the formation travels along the flight path, wherein the first plurality of radar signals are orthogonally coded to radar signals transmitted from other satellites of the plurality of satellites; and
receive, from the receiver, a second plurality of radar signals returned from the area in response to transmission of at least the first plurality of radar signals, the second plurality of radar signals comprising a first portion of radar signals representative of reflections of the first plurality of radar signals from the area and a second portion of radar signals representative of reflections from the area of a third plurality of radar signals transmitted toward the area by at least one other satellite of the plurality of satellites.

9. The satellite of claim 8, further comprising:

a sensor disposed in the bay to detect at least one distance between the satellite and at least one other satellite of the plurality of satellites.

10. The satellite of claim 9, wherein the processing device is further configured to:

generate the image data for the image of the area based, at least in part, on the at least one distance.

11. The satellite of claim 8, wherein the processing device is further configured to:

determine a range compression for at least the satellite for resolving a vertical dimension of the image of the area, the range compression determined based at least on the first plurality of radar signals and the second plurality of radar signals;

determine an angular diversity for at least the satellite for resolving a cross-track dimension of the image of the area, the angular diversity determined based at least on the first plurality of radar signals and the second plurality of radar signals; and determine a movement of at least the satellite along the flight path for resolving an along-track dimension of the image of the area, the movement determined based at least on the first plurality of radar signals and the second plurality of radar signals.

12. The satellite of claim 8, wherein the processing device is further configured to:

operate the transmitter to transmit the first plurality of radar signals in a transmit window; and operate the receiver to receive the second plurality of radar signals in a receive window that does not overlap with the transmit window.

13. The satellite of claim 8, wherein the satellite further comprises:

a communication device disposed in the bay and communicatively coupled to the antenna array and the receiver to communicate with each remaining satellite of the plurality of satellites in a satellite cluster and with a remote device.

14. The satellite of claim 13, wherein the processing device is further configured to:

operate the communication device to transmit signal information based on the first plurality of radar signals and return signal information based on the second plurality of radar signals to the remote device.

15. The satellite of claim 8, wherein the processing device is further configured to:

analyze signal information associated with the first plurality of radar signals;

analyze return signal information associated with the second plurality of radar signals; and focus the image data for forming the image based on analysis of the signal information and analysis of the return signal information.

16. The satellite of claim 15, wherein focusing the image data for forming the image is done without synchronization of the second plurality of radar signals to the first plurality of radar signals and without distance measurements between the satellite and the plurality of satellites in the formation.

17. A method of operating a satellite cluster to obtain image data for producing an image of an area of earth, the satellite cluster comprising:

a plurality of satellites arranged in a formation to travel along a flight path over an area of the earth, wherein:

at least three satellites of the plurality of satellites define a plane that is orthogonally oriented to the area, the formation has a center that moves along the flight path over the area, and an orientation of the formation changes with respect to the center as the formation travels along the flight path while the plane remains orthogonally oriented to the area; and a first satellite of the plurality of satellites comprises:

a bay;

a panel coupled to the bay;

an array of photovoltaic cells disposed on a first side of the panel to provide power for the first satellite;

an antenna array disposed on a second side of the panel opposite the first side;

a transmitter disposed in the bay and coupled to the antenna array;

a receiver disposed in the bay and coupled to the antenna array; and a processing device disposed in the bay and communicatively coupled to the transmitter and receiver, the method comprising:

operating the transmitter of the first satellite to transmit a first plurality of radar signals from the antenna array toward the area while the orientation of the formation changes with respect to the center as the formation travels along the flight path, wherein the first plurality of radar signals are orthogonally coded to radar signals transmitted from other satellites of the plurality of satellites; and receiving, by the processing device of the first satellite, a second plurality of radar signals from the receiver of the first satellite, the second plurality of radar signals returned from the area in response to transmission of at least the first plurality of radar signals, the second plurality of radar signals comprising a first portion of radar signals representative of reflections of the first plurality of radar signals from the area and a second portion of radar signals representative of reflections from the area of a third plurality of radar signals transmitted toward the area by at least one other satellite of the plurality of satellites.

18. The method of claim 17, further comprising:

determine a range compression for at least the first satellite for resolving a vertical dimension of the image of the area, the range compression determined based at least on the first plurality of radar signals and the second plurality of radar signals;

determine an angular diversity for at least the first satellite for resolving a cross-track dimension of the image of the area, the angular diversity determined based at least on the first plurality of radar signals and the second plurality of radar signals; and determine a movement of at least the first satellite along the flight path for resolving an along-track dimension of the image of the area, the movement determined based at least on the first plurality of radar signals and the second plurality of radar signals.

19. The method of claim 18, further comprising:

forming a three-dimensional image of the area based, at least in part, on the range compression, the angular diversity, and the movement.

20. The method of claim 19, wherein forming the three-dimensional image comprises:

analyzing signal information associated with the first plurality of radar signals;

analyzing return signal information associated with the second plurality of radar signals; and focusing the image data for producing the image based on analysis of the signal information and analysis of the return signal information, wherein focusing the image data is done without synchronization of the second plurality of radar signals to the first plurality of radar signals and without distance measurements between the first satellite and other satellites of the plurality of satellites in the formation.

\* \* \* \* \*